US011094002B1

(12) United States Patent
Allin et al.

(10) Patent No.: US 11,094,002 B1
(45) Date of Patent: Aug. 17, 2021

(54) SELF-LEARNING AISLE GENERATING SYSTEM AND METHODS OF MAKING AND USING SAME

(71) Applicant: Catherine Allin, Mission Hills, KS (US)

(72) Inventors: Catherine Allin, Mission Hills, KS (US); Scott P. Oppliger, Overland Park, KS (US)

(73) Assignee: Catherine Allin, Mission Hills, KS (US)

( * ) Notice: Subject to any disclaimer, the term of this patent is extended or adjusted under 35 U.S.C. 154(b) by 161 days.

(21) Appl. No.: 15/706,235

(22) Filed: Sep. 15, 2017

Related U.S. Application Data

(60) Provisional application No. 62/395,091, filed on Sep. 15, 2016.

(51) Int. Cl.
*G06Q 30/06* (2012.01)
*G06F 3/0485* (2013.01)
(Continued)

(52) U.S. Cl.
CPC ....... *G06Q 30/0643* (2013.01); *G06F 3/0482* (2013.01); *G06F 3/04845* (2013.01);
(Continued)

(58) Field of Classification Search
CPC .. G06Q 30/0643; G06N 20/00; G06F 3/0482; G06F 3/04845; G06F 3/04855; G06F 2203/04805; G06F 2203/04806
(Continued)

(56) References Cited

U.S. PATENT DOCUMENTS

| 6,026,376 A | * | 2/2000 | Kenney | G06Q 30/06 |
| | | | | 705/26.61 |
| 7,689,473 B2 | * | 3/2010 | Borom | G06Q 30/02 |
| | | | | 705/26.1 |

(Continued)

OTHER PUBLICATIONS

A Virtual View of the Store Aisle—Kimberly-Clark and Others Track Shoppers in New Ways; Finding Huggies on the Shelf; By Ellen Byron Oct. 3, 2007 (https://www.wsj.com/articles/SB119136645682746972) (Year: 2007).*

(Continued)

*Primary Examiner* — Sherief Badawi
*Assistant Examiner* — Koorosh Nehchiri
(74) *Attorney, Agent, or Firm* — Avant Law Group, LLC

(57) ABSTRACT

A computer-implemented self-learning method to generate a personalized virtual aisle via a remote acquisition mechanism associated with an entity comprises the step of accessing, using an online structure, an image database to retrieve a plurality of images. Each of the plurality of images represents an item offered by the entity. The method includes using the online structure to scale each of the plurality of images in proportion to an actual size of the item being represented by the images. The method comprises creating, using the online structure and a set of rules, a plurality of aisle blocks. The method includes dynamically grouping the plurality of aisle blocks based on each of a historical record of a patron and the set of rules to create the virtual aisle. The method comprises displaying the virtual aisle on an output accessible to the patron.

18 Claims, 13 Drawing Sheets

(51) Int. Cl.
*G06F 3/0482* (2013.01)
*G06F 3/0484* (2013.01)
*G06N 20/00* (2019.01)

(52) U.S. Cl.
CPC ......... *G06F 3/04855* (2013.01); *G06N 20/00* (2019.01); *G06F 2203/04805* (2013.01); *G06F 2203/04806* (2013.01)

(58) Field of Classification Search
USPC ...................................................... 715/815
See application file for complete search history.

(56) References Cited

U.S. PATENT DOCUMENTS

| | | | | |
|---|---|---|---|---|
| 2002/0178072 | A1* | 11/2002 | Gusler | G06Q 10/10 705/26.1 |
| 2005/0177463 | A1* | 8/2005 | Crutchfield, Jr. | G06Q 30/06 705/26.9 |
| 2008/0043013 | A1* | 2/2008 | Gruttadauria | G06Q 30/02 345/419 |
| 2008/0077473 | A1* | 3/2008 | Allin-Bradshaw | G06Q 30/02 705/27.1 |
| 2011/0035299 | A1* | 2/2011 | Casey | G06Q 10/08 705/27.2 |
| 2012/0223943 | A1* | 9/2012 | Williams | G06T 19/20 345/419 |
| 2012/0239504 | A1* | 9/2012 | Curlander | G06Q 30/02 705/14.66 |
| 2012/0330781 | A1* | 12/2012 | Borrero | G06Q 30/00 705/26.8 |
| 2013/0317950 | A1* | 11/2013 | Abraham | G06Q 30/06 705/27.1 |
| 2013/0339906 | A1* | 12/2013 | Barthelt | G06Q 30/0643 715/850 |
| 2014/0081799 | A1* | 3/2014 | Levy | G06Q 30/06 705/26.7 |
| 2016/0019717 | A1* | 1/2016 | Yopp | G06Q 10/067 345/633 |
| 2017/0249693 | A1* | 8/2017 | Greenwood | G06T 15/00 |
| 2017/0300999 | A1* | 10/2017 | Wilkinson | G06F 16/288 |
| 2018/0005263 | A1* | 1/2018 | McNulty | G06Q 30/02 |
| 2019/0080391 | A1* | 3/2019 | McNair | G06F 16/904 |
| 2019/0251622 | A1* | 8/2019 | Wiedmeyer | G06Q 30/0623 |

OTHER PUBLICATIONS

Amazon Cereal—Cereals/Breakfast Foods: Grovery & Gourmet Food, https:www.amazon.com/s/ref=nb_sb_noss_2?url=search=alias%Daps&field-keywords, dated Nov. 15, 2017, 5 pages.
Target—Cereal, https://target.com/s?searchTerm=cereal, dated Nov. 15, 2017, 2 pages.

* cited by examiner

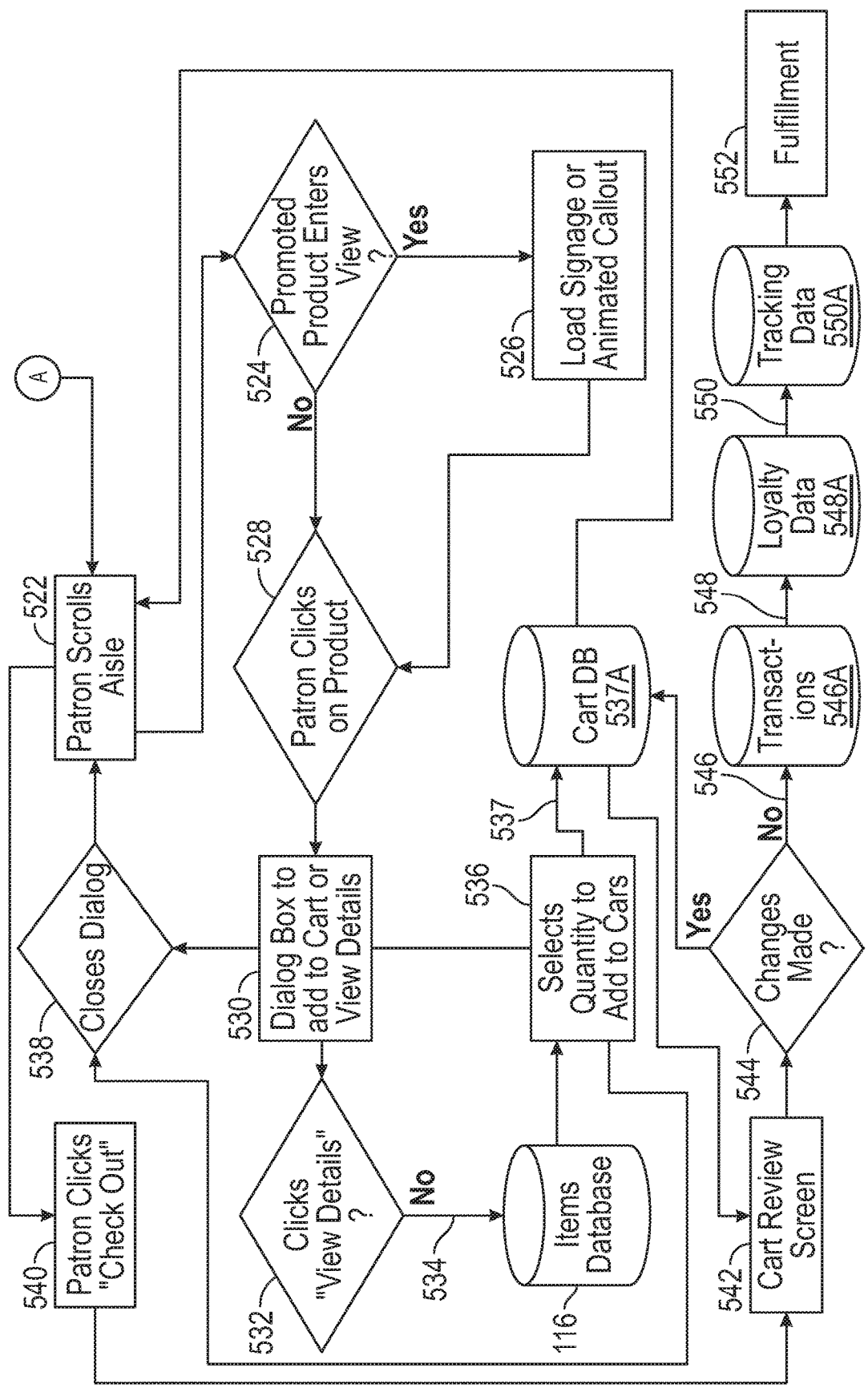

SELF-LEARNING AISLE GENERATING SYSTEM AND METHODS OF MAKING AND USING SAME

CROSS REFERENCE TO RELATED APPLICATIONS

This application claims priority to U.S. Prov. Patent Application, Ser. No. 62/395,091 filed Sep. 15, 2016, the disclosure of which is incorporated by reference herein in its entirety.

BACKGROUND

Numerous entities in this country have brick and mortar locations that patrons can visit to browse through and/or acquire items. Many of these entities also afford patrons the option to browse through and/or acquire items from locations remote from the brick and mortar locations. For example, a patron may browse through and/or acquire one or more items from the comfort of his or her home over a network using a remote acquisition mechanism associated with an entity. While the provision of an option to acquire the one or more items from a location remote from the brick and mortar location is viable and on-trend, the entities are unable to capitalize the full potential of the remote acquisition mechanisms in part because the items are presented to patrons in formats, e.g., grids and lists, that fail to emulate the experience of the patrons at the brick and mortar locations.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a computer-implemented self-learning method to generate a personalized virtual aisle via a remote acquisition mechanism associated with an entity comprises the step of accessing, using an online structure, an image database to retrieve a plurality of images. Each of the plurality of images represents an item offered by the entity. The method includes using the online structure to scale each of the plurality of images in proportion to an actual size of the item being represented by the images. The method comprises creating, using the online structure and a set of rules specific to the entity, a plurality of aisle blocks. The method includes dynamically grouping the plurality of aisle blocks based on each of a historical record of a patron and the set of rules to create the virtual aisle. The method comprises displaying the virtual aisle on an output accessible to the patron. The set of rules includes at least an affinity rule. The virtual aisle includes at least one pair of physically incompatible items disposed adjacent each other.

According to another embodiment, a non-transitory computer readable medium with computer executable instructions stored thereon executed by a digital processor to perform the method of generating a personalized virtual aisle via a remote acquisition mechanism associated with an entity comprises instructions for accessing an image database to retrieve a plurality of images. Each of the plurality of images represents an item offered by the entity. The medium includes instructions for scaling each of the plurality of images in proportion to an actual size of the item being represented by the images. The medium includes instructions for using at least a set of rules specific to the entity to create a plurality of aisle blocks. The medium has instructions for dynamically grouping the plurality of aisle blocks based on each of a historical record of a patron and the set of rules to create the virtual aisle. The medium comprises instructions for displaying the virtual aisle on an output accessible to the patron.

According to yet another embodiment, a computer-implemented self-learning method to generate a personalized virtual aisle via a remote acquisition mechanism associated with an entity comprises the step of accessing, using an online structure, an image database to retrieve a plurality of images. Each of the plurality of images represents an item offered by the entity. The method includes using the online structure to scale each of the plurality of images in proportion to an actual size of the item being represented by the images. The method comprises creating, using the online structure and a set of rules, a plurality of aisle blocks. The method includes dynamically grouping the plurality of aisle blocks based on each of a historical record of a patron and the set of rules to create the virtual aisle. The method comprises displaying the virtual aisle on an output accessible to the patron.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Many entities provide goods and/or services through electronic media. For example, entities such as Target, Wal-Mart, Macy's, JCPenney, etc., all have remote acquisition mechanisms that patrons can use to browse through and/or acquire items from a location remote from the physical location of the items. Physical space associated with an entity is limited, and the entity may not be able to use that limited space to effectively display each item that it carries. The remote acquisition mechanisms allow entities to expose patrons to more items, including items that are not available at the brick and mortar storefront.

Amazon, whose remote acquisition mechanism is accessible by patrons via the website Amazon.com, is one of the world's biggest entities. The term entity, as used herein, refers to any company, partnership, institution, etc., that allows patrons to acquire one or more items in exchange for something else (e.g., cash, bitcoin, etc.). The phrase remote acquisition mechanism, as used herein, refers to a website, application, or other such virtual portal associated with an entity that allows patrons to browse through and/or acquire one or more items from a location remote from the location of the items. As is known, patrons can use the Amazon remote acquisition mechanism to search for and acquire many different kinds of items. The Amazon website has a search bar in which the patron enters the item (or item type) he wants to acquire. The Amazon website then displays the results in a grid, and the patron typically must scroll down the page to view all the items displayed on the page. The grid may span many hundreds of pages.

Figure 1:
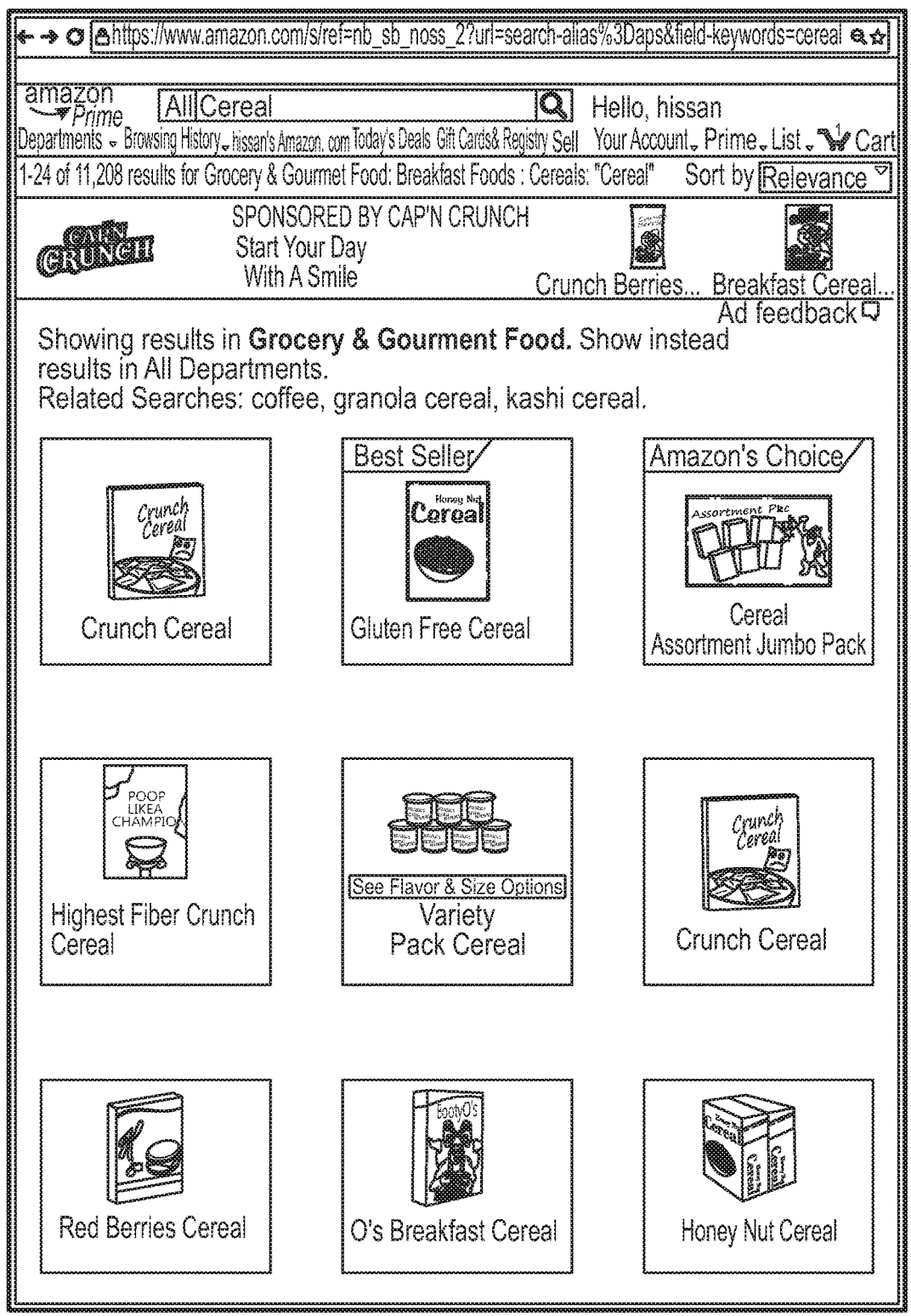
FIG. 1 is a schematic representation of a prior art system output for allowing patrons to browse through and/or acquire items from a location remote from the physical location of the items.

FIG. 1 schematically represents an output 1 of the Amazon remote acquisition mechanism (website in this example) being used to search for an item (here "cereal"). As can be seen, the results are displayed in the form of a grid 2. The size of the grid 2 visible on the patron's computer display is 3×3, and as such, only nine items are visible at a time in this example. The patron must scroll down on the page to review the remaining items on the page. And, if the search yields many results, as is typical, the patron may have to click through several different pages before finding the item he or she seeks to acquire.

Figure 2:
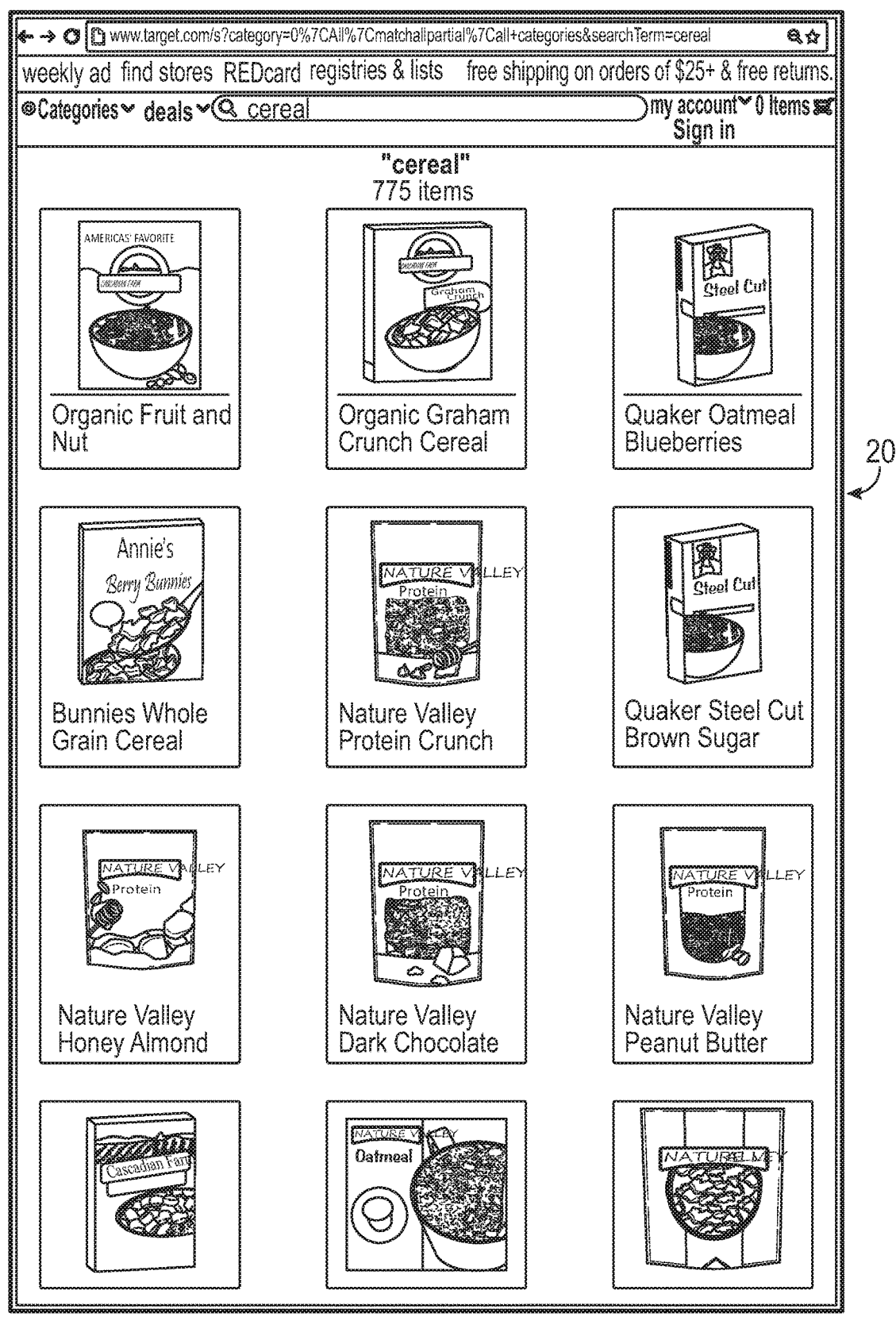
FIG. 2 is another schematic representation of a prior art system output for allowing patrons to browse through and/or acquire items from a location remote from the physical location of the items.

Taxonomy is defined as the science of classification according to a predetermined system. The skilled artisan may refer to the illustrated Amazon taxonomy as a grid taxonomy, because the items are displayed on the Amazon website in the form of a grid. Grid taxonomy is one of the most common taxonomies employed by remote acquisition mechanisms (e.g., e-retail websites and applications). FIG. 2, for example, schematically represents a webpage associated with the remote acquisition mechanism of Target. As can be seen, this website too employs the grid taxonomy and the items (cereal in this example) appear on the page in the form of a grid 20.

The grid taxonomy has several benefits, chief among which is that it allows for multiple items to be displayed on a page. But, such grid taxonomies do not emulate a patron's experience at the brick and mortar location. Items are typically arranged in the brick and mortar locations in aisles, and each aisle may be configured to display several items that have some relationship to each other. Aisles thus facilitate cross-selling and impulse buying. Studies show that while e-retail shopping using remote acquisition mechanisms is on the rise, patrons are nevertheless more likely to make impulse buys at the brick and mortar locations. One study, for example, reported that about 25% of patrons spent more funds online than they originally intended, whereas 40% of in-store patrons spent more funds than they had planned. An aisle taxonomy, implemented on a remote acquisition mechanism (e.g., on a website, application, or other virtual platform associated with an entity), may therefore be desirable as it may increase impulse buys while still affording the patrons the convenience to shop from home or another location of their choosing. Such a virtual aisle taxonomy may further be beneficial because it may serve to emulate the patron's experience in-store. And further yet, the virtual aisle taxonomy, unlike the aisles in brick and mortar stores, may not be limited by the physical confines of the brick and mortar store. The present disclosure, among other things, provides for virtual aisles, which may be used by any entity on its virtual platform to increase item acquisition and to enhance patrons' experience. More specifically, the present disclosure, among other things, provides a virtual aisle generating system that can generate virtual aisles and dynamically adapt such virtual aisles based on one more factors, e.g., the item acquisition history of the patron, the association of an item with another item, any promotions applicable to the entity, etc.

Figure 3:
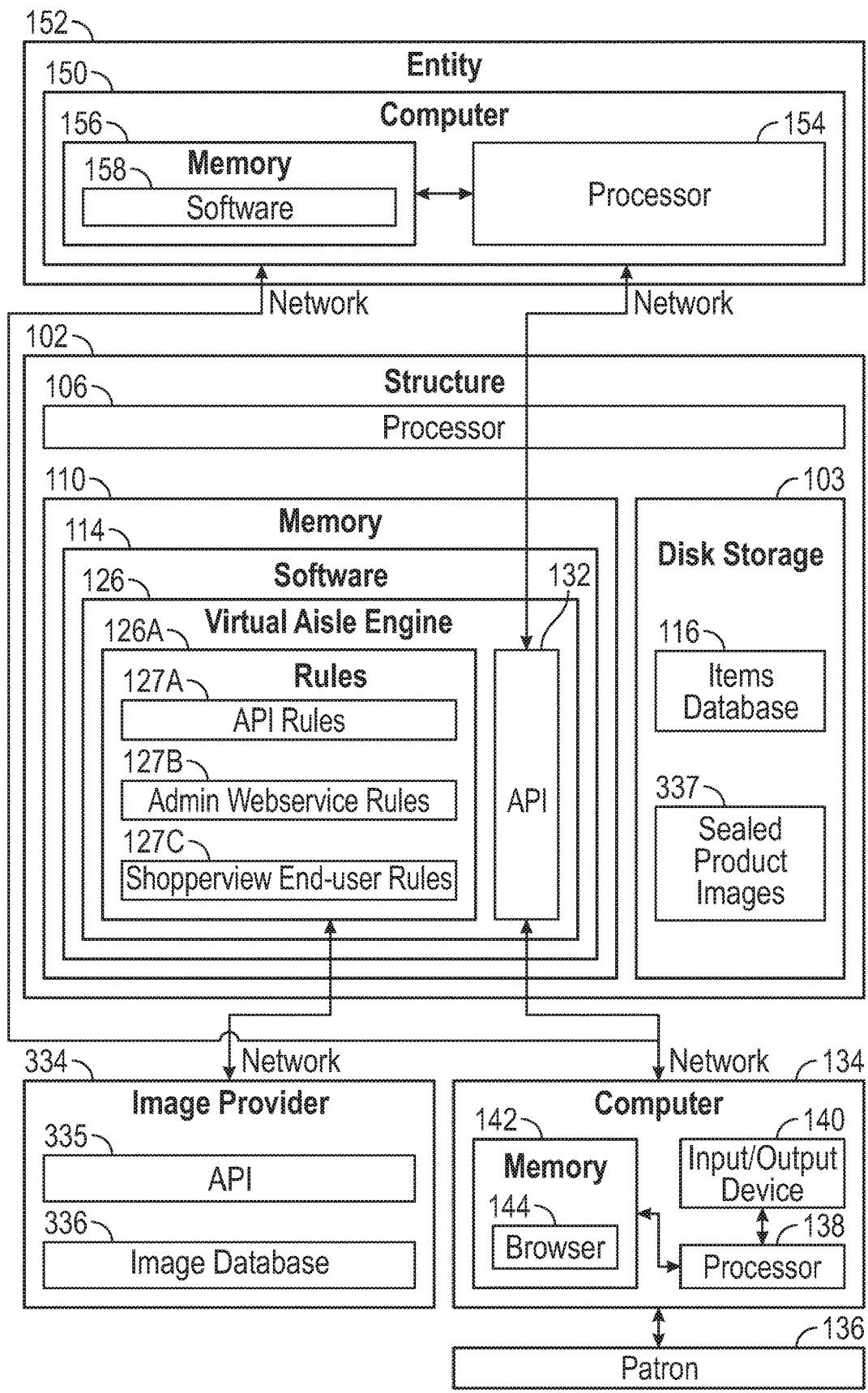
FIG. 3 schematically illustrates an example self-learning virtual aisle generating system, according to an embodiment of the present disclosure.

Attention is directed to FIG. 3, which shows an example self-learning virtual aisle generating system 100 for generating virtual aisles (e.g., the virtual aisles shown in FIGS. 5 through 8 discussed below) for use by a patron 136 through an online structure 102. Online structure 102 may be implemented by one or more networked computer servers, and as is known, may include a digital processor 106 and a network interface that allows the structure 102 to communicate over one or more of a wired and wireless network with other components of the system 100.

The structure 102 may also have a memory 110 and a disk storage 103, each of which represents one or more of volatile memory (e.g., RAM) and non-volatile memory (e.g., ROM, FLASH, magnetic media, optical media, cloud storage, etc.). Although shown within structure 102, memory 110 and/or disk storage 103 may be, at least in part, implemented as network storage that is external to structure 102 and accessed via a network interface of the structure 102. In embodiments, the memory 110 may at least in part comprise volatile memory (e.g., RAM) and the disk storage 103 may at least in part comprise non-volatile memory (e.g., HDD, SDD, optical disks, or other non-ephemeral storage such as Amazon S3 buckets, etc.).

In an embodiment, the memory 110 may include software 114, which may be stored in a transitory and/or a non-transitory portion of the memory 110. Software 114 may include machine readable instructions that are executed by processor 106 (or another processor remote from the structure 102 and in data communication therewith) to perform the functionality of the structure 102 as described herein. In an embodiment, and as discussed in more detail herein, the software 114 may include or have accessible thereto "affinity rules" 503 (discussed below, see FIG. 10) and acquisition data (e.g., purchase history, loyalty data, collectively referred to as patron loyalty data in FIG. 10, etc.) of the patron 136.

In the illustrated embodiment, the software 114 includes a virtual aisle engine 126. The virtual aisle engine 126 may include an Application Programming Interface 132. The Application Programming Interface 132 may allow an entity 152 and/or the patron 136 to communicate with the structure

102 to, e.g., configure virtual aisles, display virtual aisles, acquire items using virtual aisles, etc.

In an embodiment, the virtual aisle engine 126 may include rules 126A. The rules 126A may include or be governed by a segment of the software 114. For example, in the illustrated embodiment, the rules 126A may include API rules 127A, Admin Webservice Rules 127B, and Shopperview End-User Rules 127C. In an embodiment, one or more of the API rules 127A, Admin Webservice Rules 127B, and Shopperview End-User Rules 127C may be services, e.g., web-services that are governed by the respective rules 127A, 127B, and 127C. Each of these rules 127A-127C may, in embodiments, be configured for the handling and/or performance of a discrete service to be effectuated by the software 114. In an example embodiment, the API rules 127A may handle the communications between the structure 102 and the image provider 334 (discussed below). The API rules 127A may also handle communications between a computer and/or server of the entity 152 and the structure 102. The Admin Webservice Rules 127B may, in embodiments, allow the entity 152 to connect to the structure 102 to build, modify, or otherwise interact with the virtual aisles. The Shopperview End-User Rules 127C may, in embodiments, be responsible for serving up the virtual aisle to the patron (e.g., the end user 136) on a computer 134 thereof.

The structure 102, via the software 114, may communicate over a wired or wireless network with the image provider 334. The image provider 334 may, in embodiments, comprise an Application Programming Interface 335 and an image database 336. The API 335 may allow the software 114 to connect to the image provider 334 over a network to retrieve images from the image database 336. The image database 336 may, for example, include unscaled images of items (e.g., hundreds of thousands of items) indexed to their respective UPCs or other identifying indicia. For instance, the image database 336 may include standard images of a plurality of different cereal boxes (and/or other items) that may be acquired by patrons at the entity 152.

The standard images of the items stored in the image database 336 may be useable in grid taxonomies where the relative size of the item or its packaging (as compared to the size of another item or its packaging) is unimportant. However, these standard images stored in the image database 336 may be unusable in virtual aisles or at least be generally ineffective. A standard image of an item may be too large and may undesirably take up a majority of the area of the virtual aisle displayed on the user computer 134. Or, for example, the standard image may have the wrong perspective. The software 114 may scale the standard images stored in the image database 336 in proportion to actual size of the product/package represented in the image. For example, the software 114 may scale images of a ¼ gallon milk carton and a ½ gallon milk carton such that the image of the former is about ½ the size of the image of the latter. Or, for example, the image of a large loaf of bread may be scaled in proportion to its actual size such that it appears larger than a scaled image of a smaller loaf of bread (see scaled image 303A of the large loaf of bread as compared to the scaled image 303B of the small loaf of bread in FIG. 5). As will become clear from the disclosure herein, scaling of the item images in the image database 336 in proportion to the actual size of the item (or its packaging) represented thereby may give the patron 136 a more realistic sense of the item on the virtual aisle when that image is placed in the virtual aisle next to images of other items that are also appropriately scaled.

In an embodiment, the scaled product images may be stored in the disk storage 103 as scaled product images 337. The disk storage 103 may further include an items database 116, which may store pertinent information (e.g., names, caloric information, price, barcodes, applicable promotions, etc.) of the items whose images are provided in the scaled product images database 337. Thus, an item (e.g., a cereal box) may be selected from the items database 116 and a proportionally scaled image thereof may be selected from the scaled product images database 337 in the generation of the virtual aisle. The actual size of the item (e.g., the actual length, the actual height, and/or the actual width of the cereal box) may be stored in the image database 336 or the structure 102, may be obtained by the structure 102 from publically available sources, or may be determined by an owner or operator of the structure 102.

The online structure 102, via the Application Programming Interface 132, may communicate over a wired or wireless network with a computer 150 of the entity 152. As is known, the entity computer 150 may have a processor 154 and a memory 156. Processor 154 represents one or more digital processors, and memory 156 represents one or more of volatile memory (e.g., RAM) and non-volatile memory (e.g., ROM, FLASH, magnetic media, optical media, and so on). Memory 156 may, in embodiments, be external to the entity computer 150 and be accessed by the computer 150 over a network.

In one embodiment, computer 150 is a mobile computer, such as a laptop, notebook, tablet, smartphone, et cetera, that is used by the entity 152. In another embodiment, computer 150 is a stationary computer, such as a desktop computer situated within the entity 152 (e.g., at a corporate headquarters of the entity 152). The entity 152 may communicate with the structure 102 via a wired or wireless network and API 132, e.g., using a web browser, to view the virtual aisles in much the same way as the patron 136. The entity 152 may also connect to the structure 102 via the API 132 and the network, e.g., using a web browser, to create, configure, and/or manage the items and virtual aisles containing those items associated with the entity 152. In some embodiments, the entity software 158 may be a web browser (e.g., Internet Explorer, Google Chrome, or other browser) having associated therewith a graphical user interface that the entity 152 may employ to interact with the structure 102 (e.g., to create a virtual aisle, to manage a virtual aisle, to modify the items in the items database, etc.).

Patron 136, who is a shopper at the entity 152, may have a stationary or mobile computer 134 (e.g., a smart phone, a notebook, a tablet, a laptop, desktop, et cetera). The computer 134 includes a processor 138 in communication with memory 142. The processor 138 represents one or more digital processors and the memory 142 represents one or more of volatile memory and non-volatile memory. The memory 142 may contain browser 144 or other such software, whether now known or subsequently developed, that allows the patron 136 to access over a wired and/or wireless network websites or other virtual platforms, such as the website (or other virtual interface) of the entity 152. The computer 134 may have an input/output device 140 (e.g., a mouse, a display, a touch screen, a keyboard, et cetera) that allows the patron 136 to access the remote acquisition mechanism (e.g., e-retail website) and the structure 102 and interact therewith. While not expressly shown in FIG. 3, the artisan will readily appreciate that the other computers and servers disclosed herein may likewise include an input device and an output device to allow the users thereof to interact therewith.

FIG. 3 shows that the structure 102 is in communication with a solitary entity computer 150. The artisan, however, will appreciate from the disclosure herein that the structure 102 may likewise be configured to communicate with computers of multiple (e.g., tens, hundreds, thousands, etc. of) entities. Similarly, while FIG. 3 shows the structure 102 is in communication with one user computer 134, the structure 102 may be configured to communicate with mobile or other computers of multiple unique users.

FIGS. 4-9 and 11 schematically represent sample outputs, e.g., webpages of a remote acquisition mechanism 200 of the entity 152, which the patron 136 may access via his computer 134. The artisan will appreciate that while the remote acquisition mechanism 200 may be an e-retail website, that such is not a requirement. Indeed, the disclosure contemplates that virtual aisles may be generated and displayed to the patron 136 using any virtual interface whether now known or subsequently developed (e.g., the patron 136 may download an "App" (or other software) onto his computer 134 and interact with the virtual aisles via the App).

To illustrate the workings of the system 100, consider that the patron 136 wishes to use the remote acquisition mechanism 200 to browse through and/or acquire breakfast items.

Figure 4:
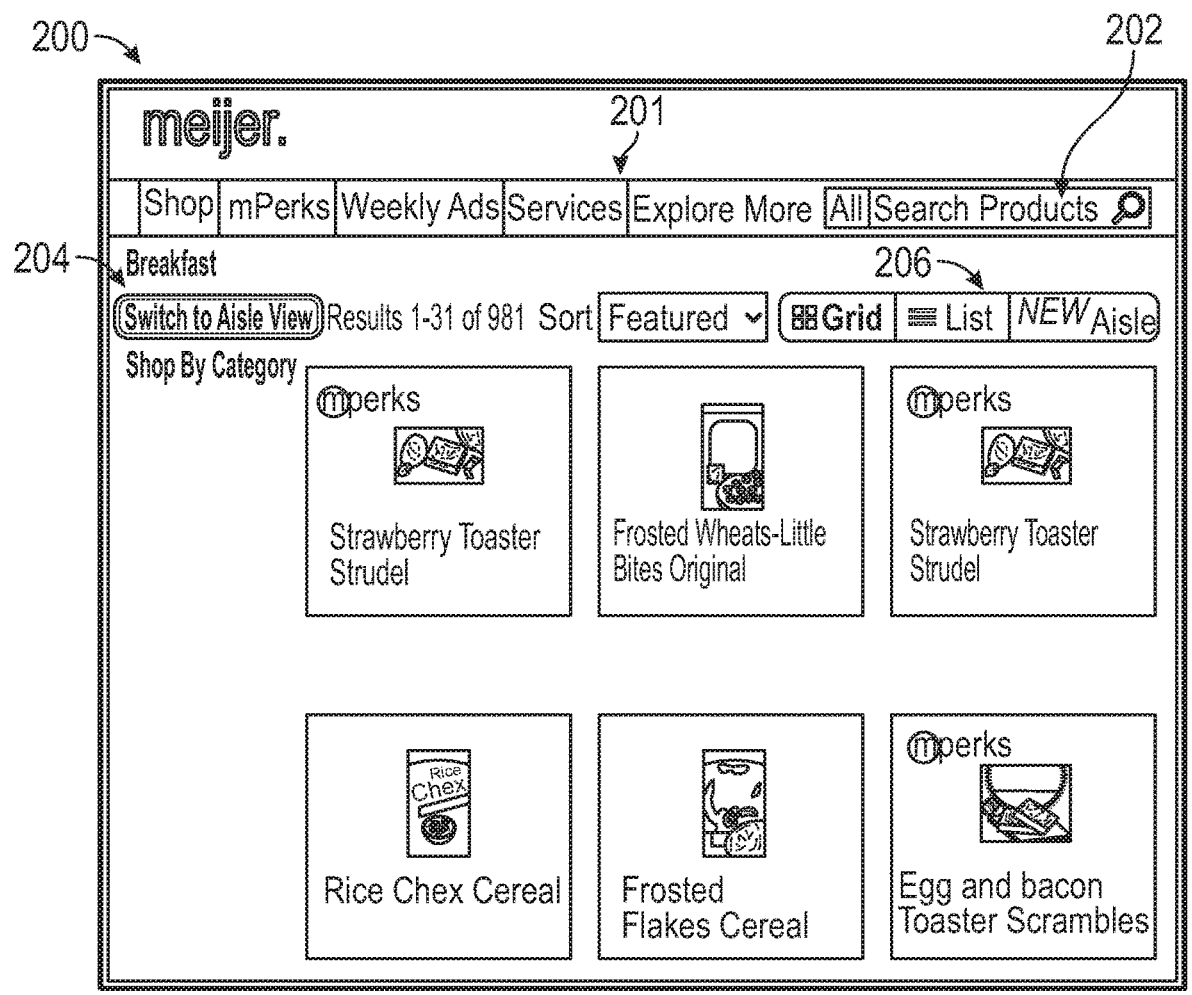
FIG. 4 schematically illustrates a grid output of the self-learning virtual aisle generating system of FIG. 3, according to an embodiment.

FIG. 4 shows an example output of the remote acquisition mechanism 200 associated with the entity 152. The output may be displayed to the patron 136 as a webpage of a website. The first page 201 (and one or more of the other pages of website 200) may have a search bar 202 which allows the patron 136 to enter specific items (or item groups or categories as discussed herein) he wishes to browse through and/or acquire. The first page 201 (and one or more of the other pages) may also have a group selector tool 204 which allows the patron 136 (or any other individual) to select a group of items. In this illustrative example, the patron 136 has selected "breakfast" as the group via the group selector tool 204. In some embodiments, the loyalty data 548A (FIG. 10, discussed herein) of the patron 136 may be used to automatically generate a virtual aisle for the patron 136 without the patron 136 having to enter anything into the search bar 202.

Figure 5:
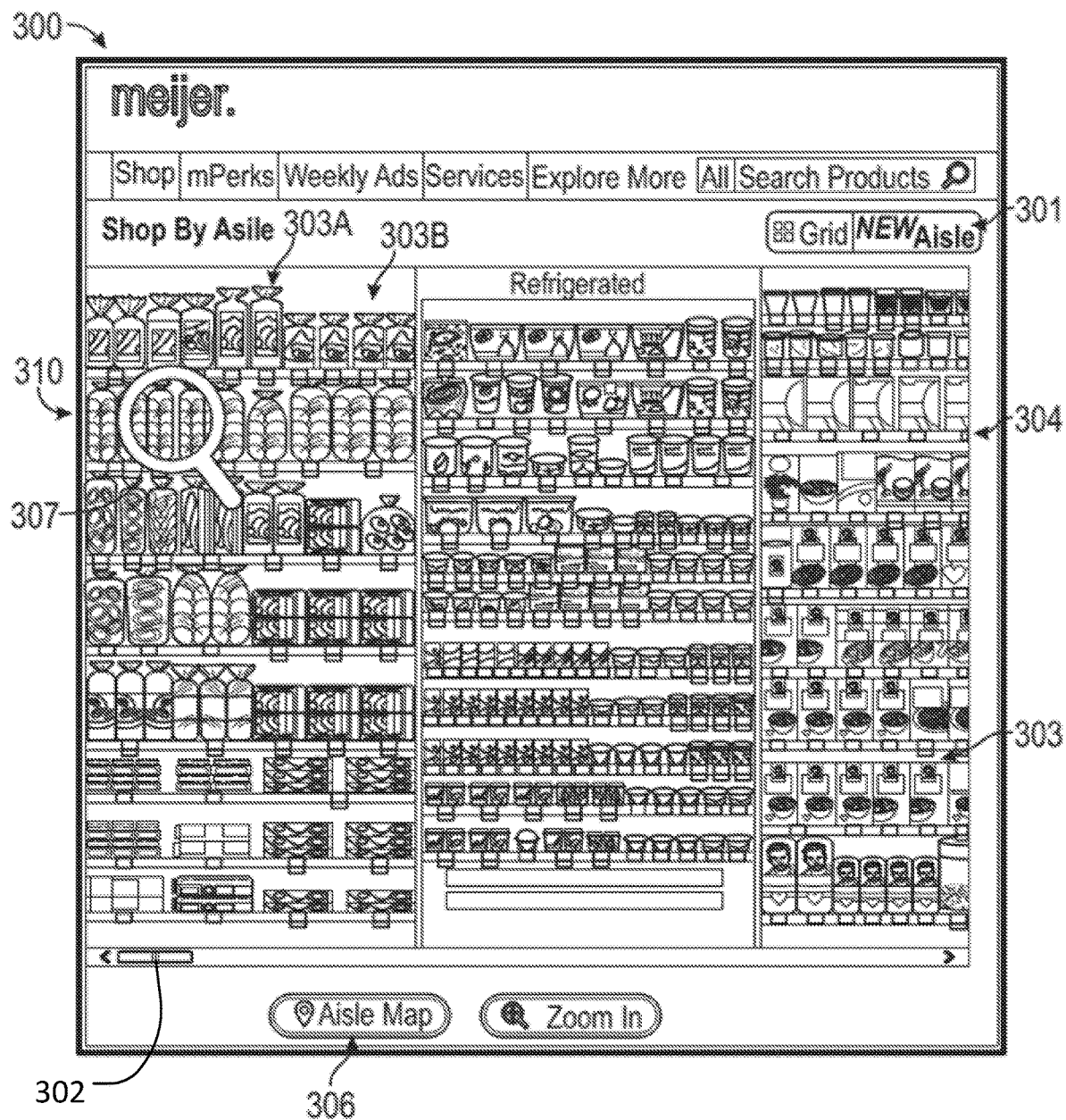
FIG. 5 schematically illustrates an example virtual aisle output of the self-learning virtual aisle generating system of FIG. 3, according to an embodiment.

The website 200 (or other virtual platform) may also have a view selector tool 206, which may allow the patron 136 to review the search results in grid view, a list view, an aisle view, etc. FIG. 4 shows the breakfast items being displayed in a grid view. The patron 136 may use the input/output device 140 to select aisle view via the view selector tool 206. FIG. 5 schematically shows the output 300 (e.g., a webpage) of the virtual platform 200 illustrating the aisle view 301. As can be seen, when in the aisle view 301, the patron 136 can view the items 303 (e.g., items 303 offered for sale by the entity 152) arranged as they would be in a physical brick and mortar store—on an aisle 304 that carries the specific item the patron 136 is looking for and related items. For example, where the selected group is breakfast (as in the illustrated example), the webpage 300 may show cereal, pastries, breakfast meats, juice, milk, eggs, frozen hash browns, and other breakfast items all on the same virtual aisle 304.

Displaying items virtually on an aisle, as shown in FIG. 5, as opposed to on a grid or a list for example, may have several benefits. A virtual aisle display may increase impulse buying and may serve to better emulate the experience of the patron 136 at a brick and mortar location of the entity 152 (as compared to a grid taxonomy or a list taxonomy, for example). Further, since entities have been selling items on physical aisles for many decades, the underlying science and techniques to enhance shopper experience and convenience through aisles is fairly well-developed. The virtual aisles (e.g., aisle 304), as shown, may take advantage of at least some of these well-developed techniques to provide a patron a superior experience as compared to the prior art remote acquisition mechanisms.

In an example embodiment, when the patron 136 selects the group (e.g., breakfast in this example), the virtual aisle 304 may be generated dynamically by the virtual aisle engine 126 (FIG. 3). The virtual aisle engine 126 is software having machine readable instructions which, when executed by the processor 106 or another processor, allow the virtual aisle 304 to be generated for display on the output device 140 of the patron computer 134. The virtual aisle engine 126 may access the disk storage 103, e.g., the items database 116 and the scaled product images database 337, and use a predetermined set of rules (e.g., affinity rules set up by the entity 152 as discussed herein) and historical item acquisition data associated with the patron 136 to ascertain which items 303 are to be displayed on the virtual aisle 304 for that patron 136. The set of rules 126A may outline, for example, the number of facings on the aisle 304 for each item 303 in the selected group, the location of an item 303 on the virtual aisle 304, applicable promotions, price, and other pertinent information, etc. In an embodiment, at least some of the rules 126A in the set of rules may be stored in the items database 116 (and/or in the memory 110 or an external memory).

Figure 6:
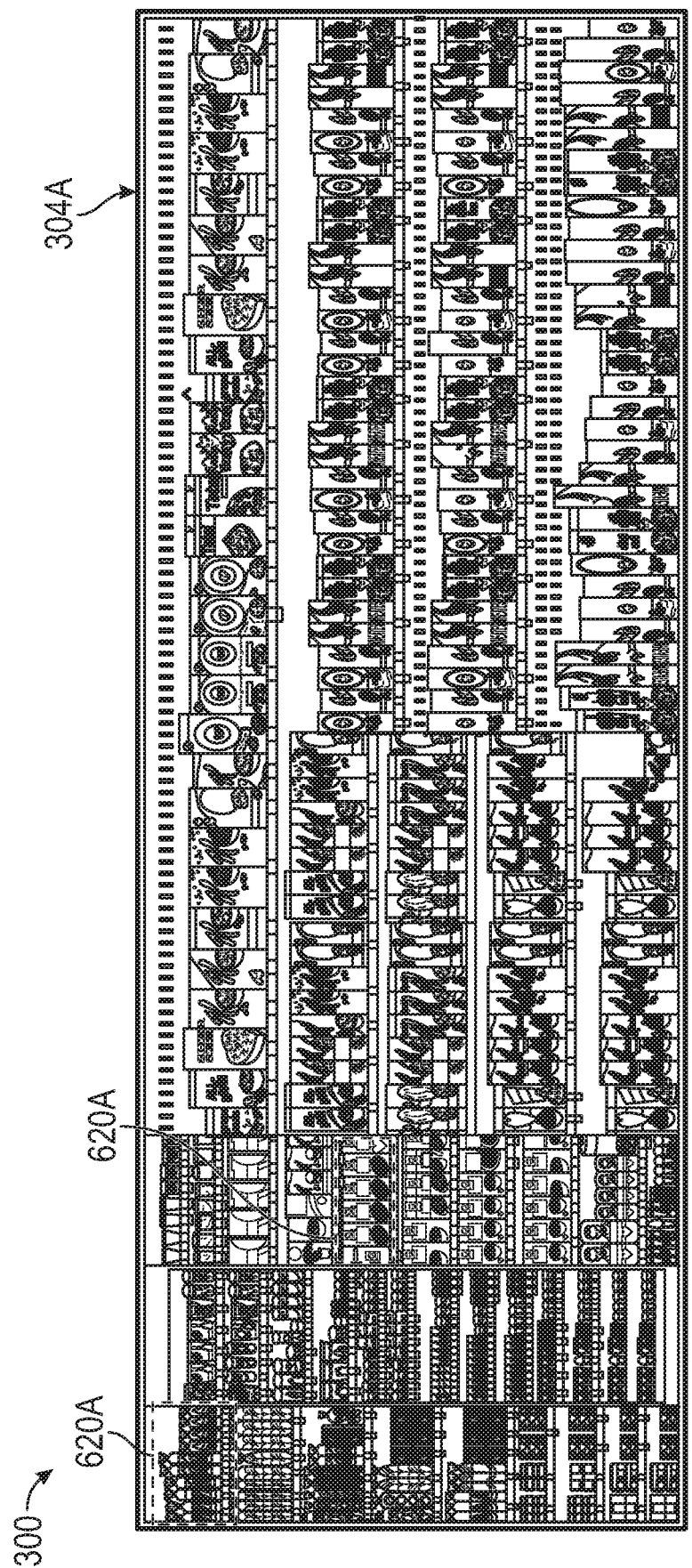
FIG. 6 schematically illustrates the virtual aisle output of FIG. 5 in additional detail.

The webpage 300 may have a scroll bar 302 (FIG. 5), which may allow the patron 136 to scroll left or right as appropriate to view the entire aisle 304A (FIG. 6). In an example embodiment, the patron 136 may not need to scroll up or down as the full height of the virtual aisle 304 may be displayed on the output device 140 (i.e., just as in physical stores where the patron 136 walks left to right (or right to left) across the aisle to view all the items placed thereon, the patron 136 may scroll left and right to view all items 303 situated on the virtual aisle 304A). The patron 136 may in an example embodiment "zoom out" the aisle 304A to view the entire aisle 304A at once (or to view a larger portion of the aisle 304A). FIG. 6, for example, shows an example breakfast aisle 304A after the patron 136 has zoomed out the aisle of FIG. 5. In example embodiments, the patron 136 may further use keyboard arrows, click-and-drag, finger gestures on a touch screen, etc., to browse the entire virtual aisle 304A. In some embodiments, a virtual magnifying glass 307 (see FIG. 5) may be provided to allow the patron 136 to "zoom in" on any particular item or group of items 303 on the virtual aisle 304A.

Figure 7A:
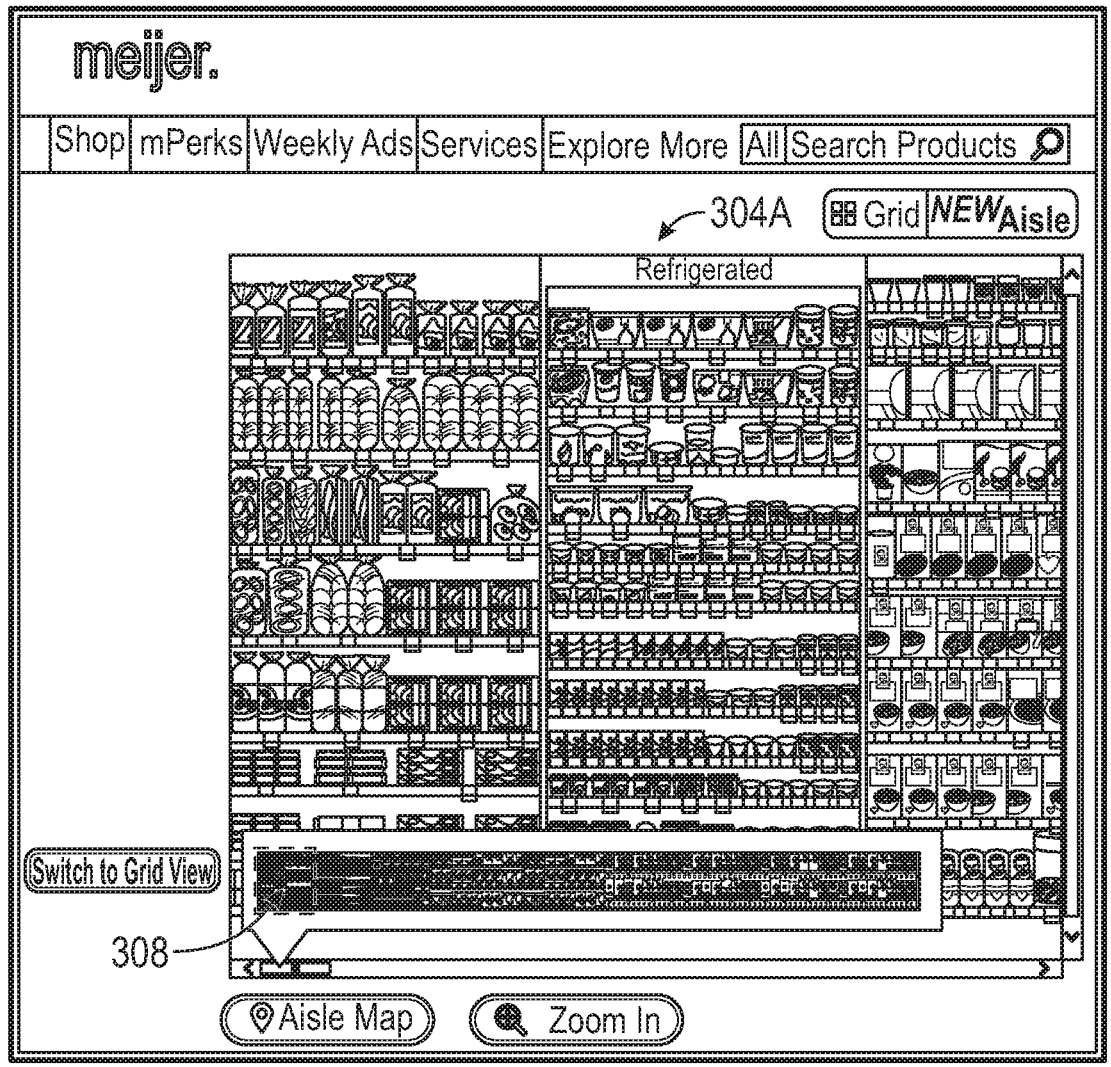
FIGS. 7A-7B schematically illustrate additional example features associated with the virtual aisle output of FIG. 5.
Figure 7B:

In an example embodiment, the output 300 may include an aisle map feature 306 (FIG. 5), which the patron 136 may utilize to review his current location on the virtual aisle 304A. For example, FIGS. 7A-7B show example outputs (i.e., different portions of the virtual aisle 304) after the aisle map feature 306 has been selected. As can be seen in FIGS. 7A-7B, the aisle map feature 306 may allow the patron 136 to pinpoint his current location 308 on the virtual aisle 304A. In an embodiment, the patron 136 may be able to utilize the aisle map feature 306 only where his computer 134 is a desktop computer. In other embodiments, the aisle map feature 306 may be available on different types of patron computers 134.

The system 100 may afford the entity 152 much flexibility in generating the virtual aisles (e.g., aisle 304A and other aisles). The entity 152, using the computer 150 and the structure 102, may be able to conveniently reconfigure the aisle 304A so that it displays the items 303 the particular entity 152 currently offers for sale. The entity 152 may also be able to customize other features. For example, the entity 152 may be able to conveniently outline which items 303 are to be displayed for a particular group (or category, discussed further below).

The entity 152 may also be able to use the structure 102 to create custom groups and categories, which may not always be possible in brick-and-mortar stores. For example, entities 152 may on their respective remote acquisition mechanisms 200 (e.g., websites or other interface) display a seasonal aisle (e.g., an aisle for Thanksgiving, Christmas, or other special occasion). The example Thanksgiving aisle may include all items that may be associated with a Thanksgiving meal (e.g., everything from turkey to fryers and potatoes may be situated on one virtual aisle). Such may not be possible in a brick and mortar store (e.g., at the physical store, the turkey may be in a refrigerated meat section, the fryer may be on the appliance aisle, and the potatoes may be on the vegetable aisle, etc., and the turkey may not be situated in the same section as the fryer because the fryer cannot be placed in the fridge or freezer). The system 100 thus may afford the entity 152 more flexibility in generating the aisles as compared to brick and mortar stores.

Figure 11:
FIG. 11 schematically illustrates a pair of physically incompatible items situated side-by-side on a virtual aisle generated by the self-learning virtual aisle generating system.

Items 303 which have an association with each other but which are not (or which for all practical purposes cannot or at least ought not be) situated next to each other on a solitary physical aisle in a brick and mortar store may be referred to herein as "physically incompatible items" 600. For instance, frozen chicken wings and ketchup may be physically incompatible items 600 because they have an association with each other (e.g., are often consumed together) but these items are not placed side-by-side on the same physical aisle (i.e., the chicken wings are situated in the refrigerator in the frozen meat aisle whereas the ketchup is situated in the condiments aisle). The system 100 may, among other things, increase cross-selling by placing physically incompatible items 600 adjacent each other on the same virtual aisle (see, e.g., FIG. 11 showing a virtual aisle 602 in which two physically incompatible items 600—chicken wings and ketchup—are placed adjacent each other).

In an embodiment, the system 100 (e.g., the virtual aisle engine 126) may be configured to use the set of rules 126A to automatically select appropriate background images for the virtual aisles (e.g., shelves versus pegboard, aisle versus endcap, the number of shelves per aisle, et cetera). The software 114 may be able to rapidly populate the virtual aisle 304A with current product imagery, which may be dynamically scaled.

In an embodiment, the software 114 may be able to use store-specific planograms of the entity 152 to identify the placement of the various items 303 on the aisle 304A. Further, in some embodiments, the rules 126A may be entity specific and may allow the software 114 to present on the output device 140 (e.g., via the browser 144) virtual aisles in a way that closely emulates the aisles, merchandising, and displays at the brick and mortar location of the particular entity 152. For example, where the entity 152 is Wal-Mart, one or more virtual aisles 304A may display a "rollback" sign which the patron 136 may be accustomed to seeing at a physical Wal-Mart retail location.

Figure 8:
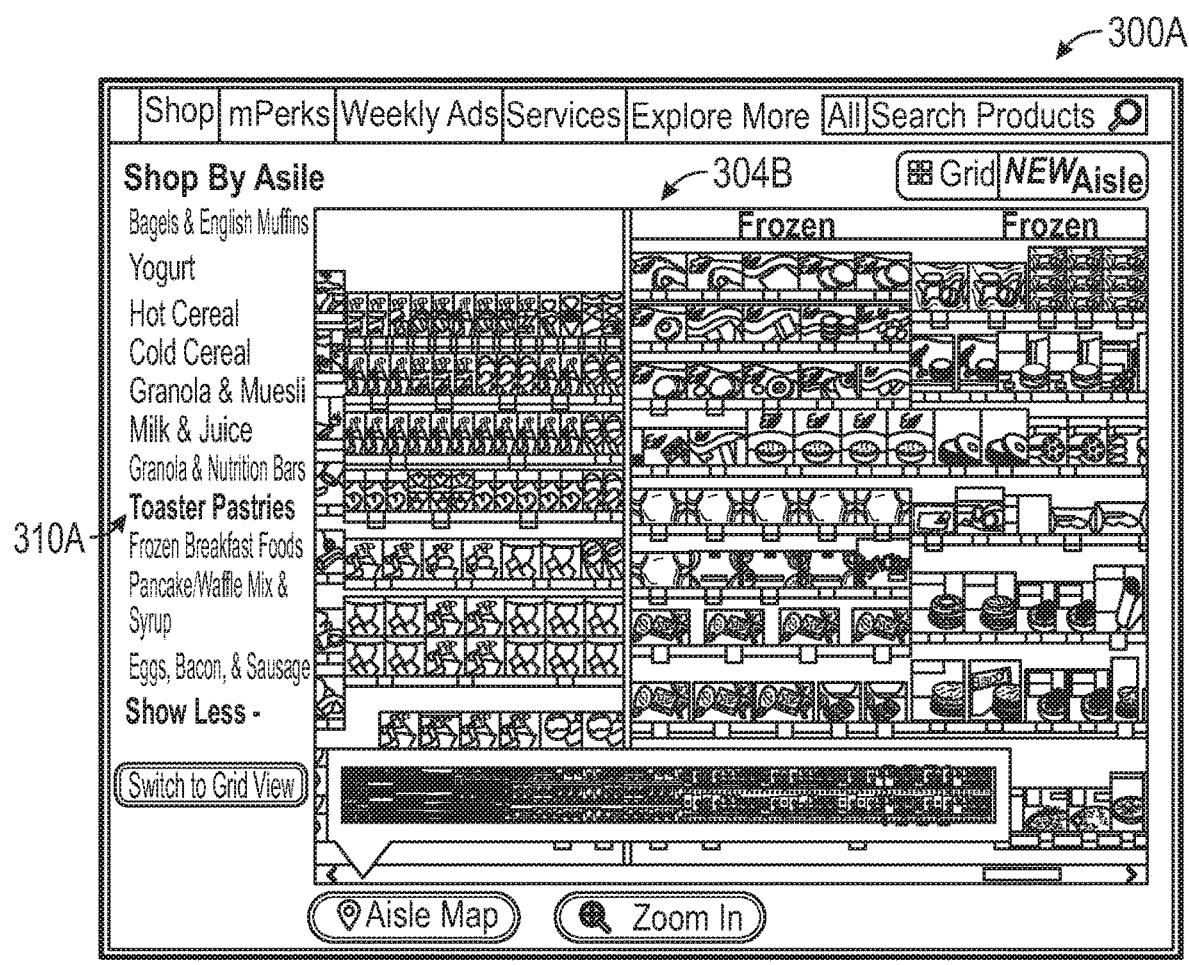
FIG. 8 schematically illustrates a category selection tool provided in a virtual aisle output of the self-learning virtual aisle generating system of FIG. 3.

In an embodiment, the output 300 may be provided with a category selector tool 310 (FIG. 5), which may allow the patron 136 to hone in on a particular category of items on the virtual aisle 304A within the selected group (breakfast in this example). For example, in the breakfast group, the patron 136 may be able to use the category selector tool 310 to click on any of the following example categories: Bagels & English Muffins; Yogurt; Hot Cereal; Cold Cereal; Granola & Muesli; Milk & Juice; Granola & Nutrition Bars; Toaster Pastries, etc., as shown in FIG. 5. FIG. 8 shows an example output 300A having a virtual aisle 304B generated by the software 114 after the patron 136 has used the category selector tool 310 to select the Toaster Pastries category 310A. When the patron 136 selects the category 310A, the system 100 may cause the aisle 304A to automatically scroll left or right to display the selected category 310A. In an embodiment, upon the selection of the category 310A, the virtual aisle engine 126 may cause the virtual aisle 304A to be scrolled to: the specific section of the aisle 304A containing the category 310A; the first instance of an item 303 matching that category 310A; or a predefined point the entity 152 has selected to represent the starting point for the selected category 310A. Of course, the patron 136 may at any time select a different product group or category, and the virtual aisle engine 126 may cause the appropriate aisle or aisle section to be displayed on the output device 140 in response.

In an embodiment, the patron 136 may be allowed to narrow his selection (e.g., narrow group or category selections) by brand, price, size, etc. This narrowed list of items may be displayed on a new virtual aisle and/or may be displayed as a grid or list. In some embodiments, the virtual aisle engine 126 may cause the selected items to be highlighted on the virtual aisle 304A in some way. For example, where there are multiple items 303 that match the narrowed selection by the patron 136, the virtual aisle engine 126 may cause the non-matching items to be shaded (e.g., greyed out) to highlight those items 303 that fit the patron's query.

The patron 136 may also use the search bar 202 (FIG. 4) to enter in keyword(s) (e.g., an item 303, item type, item category, et cetera). If multiple matching items exist, the virtual aisle 304A may highlight same (e.g., by shading the non-matching items on the aisle 304A). Where there is only one item that matches the keyword search, the virtual aisle engine 126 may automatically scroll to that item 303 on the aisle 304A. The search results may be displayed on a virtual aisle, and/or may be displayed as a grid or list, for example.

Figure 9:
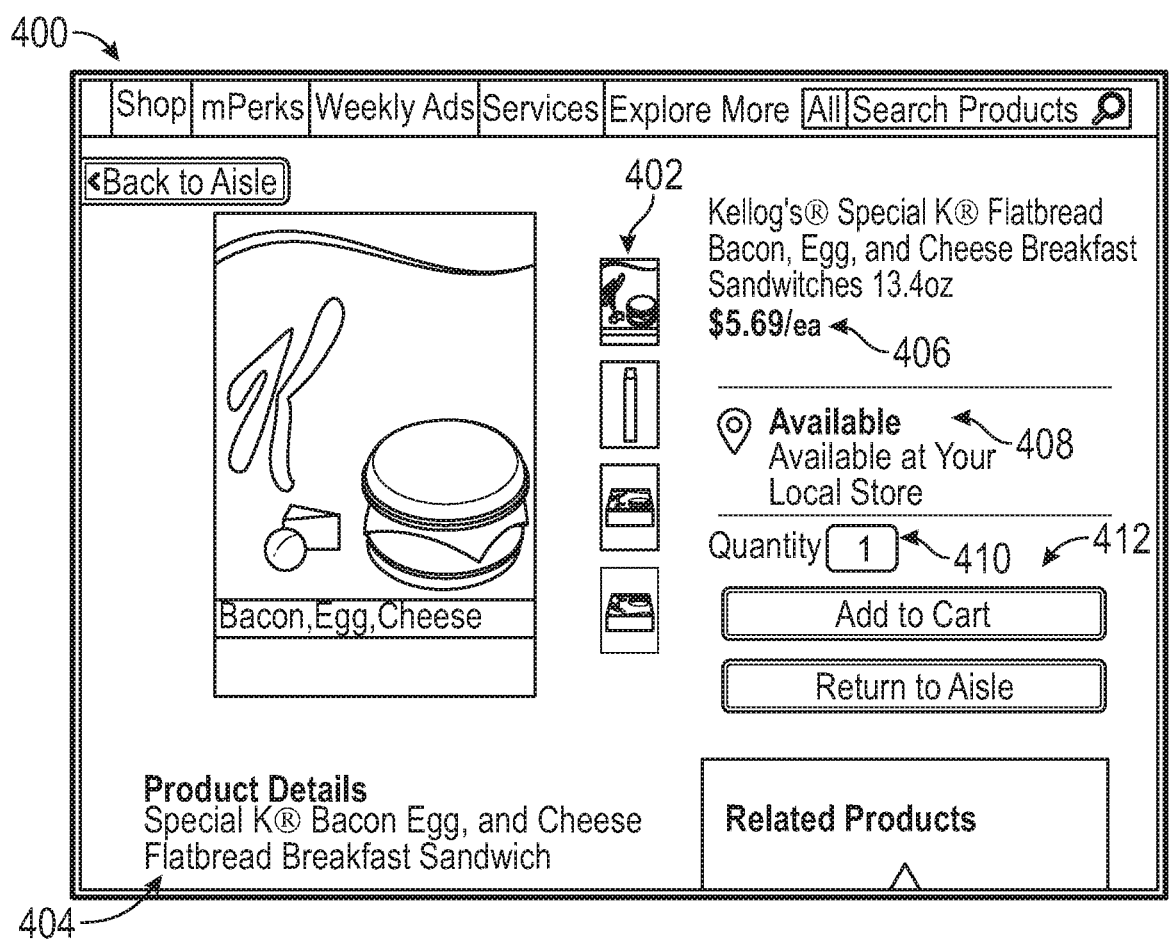
FIG. 9 schematically illustrates a product information section in a virtual aisle output of the self-learning virtual aisle generating system of FIG. 3.

The patron 136 may select an item 303 (e.g., by clicking on the image of the item 303 on the aisle 304A) to ascertain additional information about that item 303 and/or to acquire same. FIG. 9 schematically represents an output 400 (e.g., a webpage of the remote acquisition mechanism 200) which may be generated when the patron 136 clicks on the Kellogg's Flatbread breakfast sandwich in the virtual aisle 304A. The webpage 400 may have a view selector tool 402 which may allow the patron 136 to view the item 303 from the side, the back, etc. (e.g., to view the nutritional information on the actual package). The webpage 400 may also have a product details section 404 which may list details about the item (e.g., its ingredients, whether its gluten free, etc.). The webpage 400 may further display the price 406 of the selected item and its availability 408 for purchase. In an embodiment, the patron 136 may be allowed to select a quantity of the item 303 for acquisition using a quantity selector tool 410. Once the patron 136 has made his selection, he may go back to aisle view, or add the item 303 to his virtual cart where it may be stored until the patron 136 is ready for checkout. The patron 136 may be able to acquire all items 303 in the cart together upon checkout. As in a physical store, the patron 136 may be allowed to decide last-minute (e.g., at checkout) that he does not wish to purchase a particular item 303 in his cart.

The check-out processing may be integrated with the entity's existing online check-out processing. The system 100 may allow for displaying additional products or impulse items, application of coupons, collection of loyalty data, redemption of reward points, etc., upon check-out. The order of the patron 136 may be fulfilled (e.g., the purchased items 303 may be shipped to the patron 136) in line with the policies and procedures of the particular entity 152.

The virtual aisle engine 126 may be self-learning and the rules 126A may be continually and automatically updated as additional data points are available. For example, in embodiments, the rules 126A may be updated to take into account items historically acquired by the patron 136. For instance, where the patron 136 is known to purchase a particular item 303 (e.g., a tennis racket), that item 303 may be displayed on virtual aisles of several groups (e.g., sports, rackets, athletics) and/or may be featured more prominently. The system 100 may thus be a self-learning system and may be able to personalize the experience of a patron 136 based on the past acquisitions of the patron 136.

In embodiments, the virtual aisle engine 126 may dynamically generate and display the virtual aisle (e.g., virtual aisle 304A) based on the search term entered by the patron 136 and/or the browsing history of the patron 136. As one example, if the patron 136 searches for Weight Watchers breakfast bars, the rules 126A may allow for the generation of a virtual aisle that includes the Weight Watchers breakfast bars and other diet-related products. Similarly, if the patron 136 is browsing yogurt, the rules 126A may allow for the generation of an aisle comprising breakfast items. The portion of the rules 126A that allows for such interrelated items to be displayed on the same virtual aisle may be referred to herein as "affinity rules" 503. Put differently, the affinity rules 503 may allow for the grouping of items that are often acquired together (including the physically incompatible items 602).

In embodiments, the virtual aisle engine 126 may generate virtual aisles (e.g., the virtual aisle 304A) based on each of the acquisition (e.g., purchase) history of the particular patron 136 (represented as patron loyalty data 512A in FIG. 10) and the affinity rules 503 (discussed in more detail herein). For example, in an embodiment, if the patron 136 is browsing the potato chips aisle and his loyalty data 512A indicates that he has acquired Art & Mary's plain potato chips in the past, the virtual aisle engine 126 may, based on the rules 126A, assemble and generate for that patron 136 a virtual aisle or a section thereof that includes items that the entity 152 (or an administrator of the structure 102) has determined to have an affinity to those potato chips (e.g., the virtual aisle may contain Art & Mary's plain potato chips together with brie cheese, sour cream, and other items that are consumed or otherwise acquired together, etc.).

The affinity rules 503, coupled with the loyalty data 512A, may also be used to create personalized virtual aisles for the patron 136 in other ways. For example, if the patron 136 acquired ten bags of Art & Mary's chips in six of the past twelve months, but has acquired zero bags of these chips in the past six months, the virtual aisle generated for the patron 136 may automatically be provided with a discount that is useable by the patron 136 to acquire the Art & Mary's chips at a reduced price. Alternately, had the patron 136 acquired the same chips in each week of the past twelve months, the virtual aisle generated for this patron 136 may not include the discount offer. Similarly, the virtual aisle engine 126 may generated personalized aisles based on the dietary preferences of the patron 136 (e.g., gluten free, GMO, etc.), which dietary preferences may be gleaned over time from the loyalty data 512A (such as a sample set thereof).

In a brick and mortar location associated with the entity 152, one or more of the physical aisles may include signage (or other forms of advertisements, e.g., coupons) intended to focus the attention of the patron 136 on a particular item 303 or group of items 303. For example, Wal-Mart store aisles may have "rollback" signs associated with certain items 303 to convey that the identified item 303 is being offered for a reduced price. Or, for example, Target may have a "buy one get one free" sign on an aisle to entice the patron 136 to purchase the highlighted item 303. While such signage may capture the attention of a patron 136 for some time, it may over time become monotonous and ineffective.

The structure 102 may allow for customized and attention-grabbing callouts to be displayed on the output device 140 to convey a promotional message to the patron 136. As one example, where the patron 136 is shopping for cereal, a Tony the Tiger simulation may appear on the screen 140 and ask the patron 136 if he has had his breakfast today. Or, for example, the Cap'n Crunch character may convey to the patron 136 that the Cap'n Crunch cereal is being offered for a reduced price. Such virtual simulations (and other virtual signage) may enhance customer experience, and may lead to more sales as compared to the signage typically used at brick-and-mortar location of the entities.

In an embodiment, the virtual aisle engine 126 may display the same callouts to all users (including patron 136). In another embodiment, the callouts may be tailored to the particular patron 136. For example, the virtual aisle engine 126 may use the historical records of the patron 136 (e.g., his past shopping history, his loyalty card data, etc.) to display for the patron 136 customized promotional messages. Such personalization may further enhance the patron's experience and lead to increased acquisition of items.

In an embodiment, all pertinent data associated with the visit of the patron 136 to the website 200 (e.g., navigational data relating to the route the patron 136 took to view and acquire the various items 303, the items 303 the patron 136 viewed but did not acquire, the items 303 that had associated therewith a callout acquired by the patron 136, etc.) may be gathered by the virtual aisle engine 126, and may be used to provide aisle arrangements that provide better patron satisfaction and/or increased item acquisitions by the patrons. The virtual aisle engine 126 may have machine readable instructions that allow for such data to be used automatically to adaptively modify the virtual aisles 304A. Alternately, or in addition, the data may be provided to the entity 152 (e.g., to a planogrammer employed or contracted by the entity 152), and the entity 152 may use the knowledge gleaned from this data to make appropriate changes based on analytics.

The structure 102 may serve to increase in the speed of the computer 134; more specifically, the structure 102 may serve to increase the speed with which the patron 136 is able to view and acquire items using the computer 134 as compared to prior art remote acquisition mechanisms. The virtual aisle engine 126 may create a virtual aisle (e.g., aisle 304A) by piecing together two or more previously created aisle blocks (e.g., blocks 620A and 620B shown in FIG. 6). The aisle blocks (e.g., blocks 620A and 620B) may function, in effect, like Lego pieces or building blocks, two or more of which may be assembled together to form the completed virtual aisle 304A. As one example, an aisle block 620A for bread and an aisle block 620B for peanut butter may first be created and stored in the structure 102. Then, when the patron 136 accesses the structure 102 and searches for, e.g., sandwiches, the pre-existing aisle blocks 620A and 620B may be dynamically arranged adjacent each other to form the virtual aisle. By creating many aisle blocks (e.g., aisle blocks 620A and 620B and hundreds or thousands like them) in advance, the virtual engine 126 may be able to assemble said aisle blocks in any conceivable way in an insignificant amount of time. Such dynamic grouping (i.e., aggregating) of the pre-existing aisle blocks to quickly create a unique virtual aisle, based e.g., on the loyalty data, affinity rules, search terms, etc., may allow the virtual aisles to be populated on the output 140 faster than grids or lists which are generated anew in response to a patron's query. The virtual aisle engine 126 may thus increase the speed with which the patron 136 is otherwise able to view and acquire the items 303 via prior art remote acquisition mechanisms.

Figure 10:
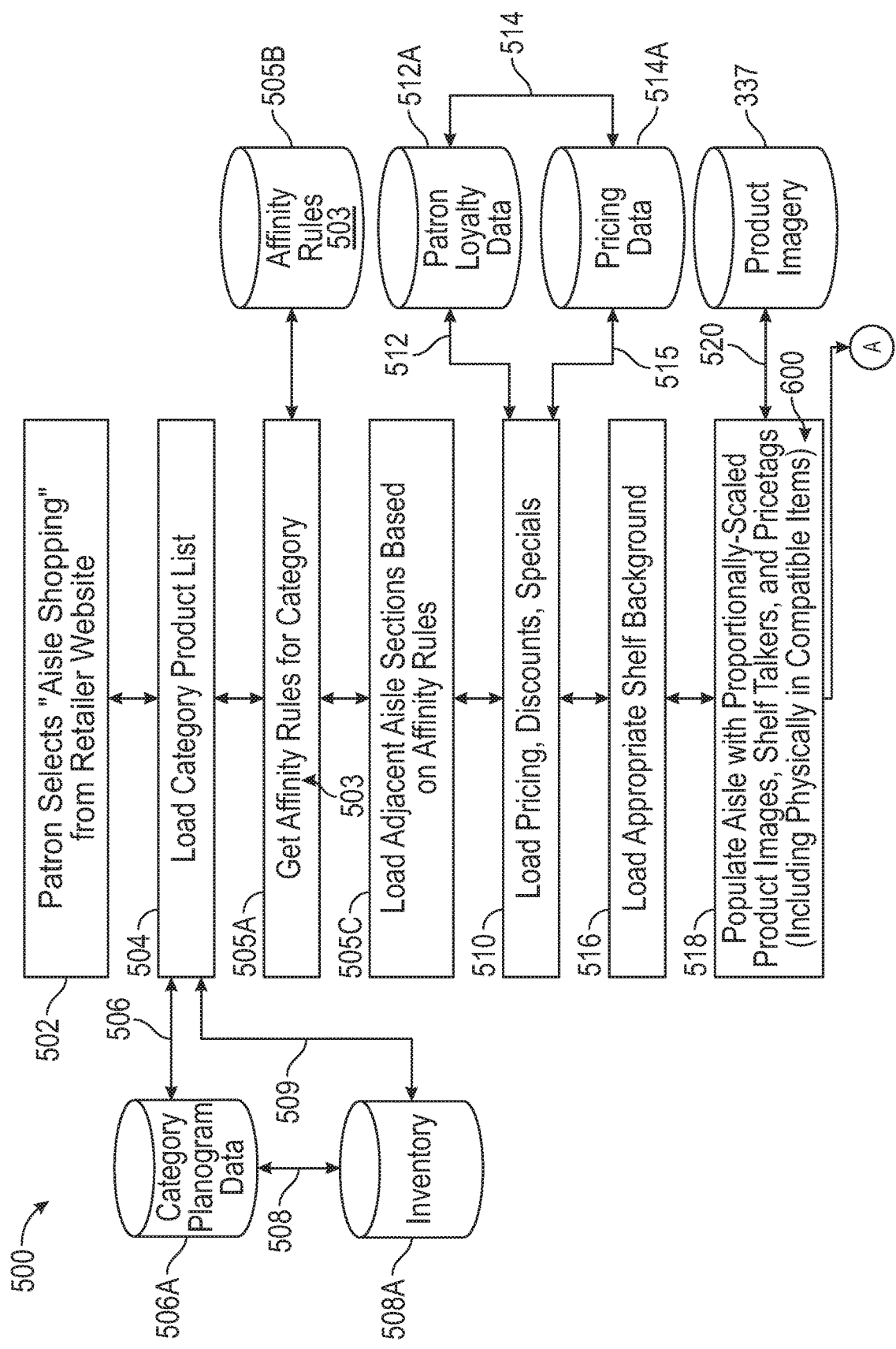
FIG. 10 is a flowchart showing an example method of using the self-learning virtual aisle generating system of FIG. 3 to generate virtual aisle, according to an embodiment.

FIG. 10 is a flowchart showing an example method of using the self-learning virtual aisle generating system 100 to generate virtual aisles. At step 502, the patron 136 may select aisle view (using, e.g., the view selector tool 206 of the remote acquisition mechanism 200 associated with the entity 152). At step 504, the software 114 may load the category product list. More specifically, the virtual aisle engine 126 may access a category planogram data 506A at step 506 for the entity 152, access an inventory database 508A at step 508, and use the pertinent data in these databases at step 509 to load the category product list at step 504. In an embodiment, the category planogram data 506A and inventory database 508A may be housed in the items database 116 or elsewhere in the structure 102.

After the category product list is loaded at step 504, the structure 102 may at steps 505A and 505B access the affinity rules 503 for the particular category. The affinity rules 503 may be stored in the disk storage 103, e.g., in the items database 116, or elsewhere in the structure 102. At step 505C, the virtual aisle engine 126 may load adjacent aisle blocks (e.g., pre-existing aisle sections 620A and 620B) based on the affinity rules 503.

After step 505C, the structure 102 may then at step 510 load pricing, discounts, and specials, etc., applicable to the category product list. More specifically, the virtual aisle engine 126 may access the patron loyalty data 512A at step 512 and the pricing data 514A at step 514, and use the loyalty and pricing data at step 515 to load the pricing, discounts, and specials at step 510.

Once the pricing, discounts, and specials have been loaded at step 510, the virtual aisle engine 126 may load appropriate aisle backgrounds at step 516. At step 518, the virtual aisle engine 126 may populate the aisle (e.g., virtual aisle 304A) with proportionally-scaled product images, displays, shelf talkers, price tags (stored in the scaled product image database 337 for example), etc. In populating the virtual aisle at step 518, the virtual aisle engine 126 may access the product images 337 (and in embodiments, the items database 116) at step 520. The product image 337, like all the other databases shown in FIG. 10, may be stored in memory 110 and/or external memory. As shown in FIG. 11, a virtual aisle 602 may expressly include at least two physically incompatible items 600 that are placed on the same virtual aisle adjacent each other. In other embodiments, the virtual aisle generated by the aisle engine 126 may be devoid of physically incompatible items 600 adjacent one another.

Once the aisle has been populated at step 518, the patron 136 may scroll the aisle at step 522. At step 524, the virtual aisle engine 126 may determine whether a promoted item is in view. If so, the virtual aisle engine 126 may load signage or an animated callout for the item being promoted at step 526. The patron 136 may then at step 528 click on an item he is interested in. If there is no item in view on the virtual aisle on which a promotion is being applied (e.g., no item that has associated therewith a particular simulation) at step 524, the patron 136 may likewise click on a item at step 528 to acquire or find additional information about same.

At step 530, a dialog box may appear (e.g., on the output device 140 of the user computer) which may instruct the patron 136 to add the item to cart and/or to view the item details. If the patron 136 clicks on the view detail option at step 532, the virtual aisle engine 126 may load item information from the items database 116 at step 534. The patron 136 may then select the quantity of the product to add to his virtual cart at step 536. Alternately, the patron 136 at step 530 may, without viewing the item information, select the quantity of the item to add to his virtual cart at step 536. At step 537, the item the user selected, along with its quantity, may be stored in a cart database 537A at step 537. The cart database 537A may include a current listing of items in the cart, along with associated information (e.g., pricing, quantity, applicable promotions, etc.).

Once the quantity of product to be placed in the cart has been selected at step 536, the dialog box may be closed at step 538. The patron 136 may then return to step 522, where may scroll the aisle again and add additional products to the cart as discussed herein.

When the patron 136 is finished browsing the aisle(s), he may click checkout at step 540. The virtual aisle engine 126 (or other software) may then at step 542 display for the patron 136 a cart review screen at step 542. In so doing, the virtual aisle engine 126 may access the cart database 537A so that all items in the cart and associated information is shown to the patron 136 for review at step 542.

At step 544, the patron 136 may be allowed to make changes to his cart. For example, the patron 136 may be allowed to delete an item from the cart, to add the quantity of an item in the cart, etc. If the patron 136 makes any changes, the data in the cart database 537A may be accordingly updated, and the cart review screen may be updated. If the patron 136 does not make any changes, the data in the cart may be saved to appropriate databases upon checkout. For example, the user information and associated purchase information may be saved at steps 546, 548, and 550 to a transactions database 546A, a loyalty database 548A, and a tracking database 550A, respectively. The transactions database 546A may include the purchase information, the loyalty database 548A may include loyalty information (e.g., loyalty points and promotions), and the tracking database 550A may include information about the shipping of the purchased items to the patron 136. As discussed above, in some embodiments, the system 100 may utilize the data in these (and other databases) to personalize the user experience at his subsequent visits to the remote acquisition mechanism 200. At step 552, the order may be fulfilled to end the method 500.

Thus, as has been described, the self-learning system 100 and its virtual aisle taxonomy may provide the patron 136 an exciting new way to acquire items from entities. Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented self-learning method to generate a personalized virtual aisle via a remote acquisition mechanism associated with an entity, comprising:
offering a plurality of items for sale;
accessing, using an online structure, an image database to retrieve a plurality of images, each of said plurality of images representing at least one of said plurality of items;
determining a number of facings of each of a first item, a second item, and a third item on said virtual aisle based on a purchase history of a patron, said purchase history including a number of times said patron has purchased each of said first item, said second item, and said third item, said number of facings of said first item being greater than said number of facings of said second item where said purchase history indicates said patron has previously purchased said first item more than said second item, and said number of facings of said second item being greater than said number of facings of said third item where said purchase history indicates said patron has previously purchased said second item more than said third item;
creating, using said online structure and a set of rules, said virtual aisle; and
displaying at least a portion of said virtual aisle on an output accessible to said patron, said portion including said first item, said second item, and said third item, and their facings;
wherein, in generating said virtual aisle, said set of rules causes to be taken into account unpurchased items previously considered but not purchased by said patron.

2. The computer-implemented self-learning method of claim 1, further comprising displaying a promotional simulation associated with one of said plurality of items.

3. The computer-implemented self-learning method of claim 1, further comprising updating a historical record of said patron based on an interaction of said patron with said virtual aisle.

4. The computer-implemented self-learning method of claim 3, further comprising generating a second virtual aisle based on said updated historical record, said virtual aisle and said second virtual aisle being disparate.

5. The computer-implemented self-learning method of claim 4, further comprising providing said displayed portion with a solitary scroll bar to scroll in a leftward and a rightward direction.

6. A non-transitory computer readable medium with computer executable instructions stored thereon executed by a digital processor to perform the method of generating a personalized virtual aisle via a remote acquisition mechanism associated with an entity, comprising:
instructions for accessing an image database to retrieve a plurality of images, each of said plurality of images representing an item offered by said entity;
instructions for determining a number of facings of each of a first item, a second item, and a third item on said virtual aisle based on a purchase history of a patron, said purchase history indicating a number of times said patron has purchased each of said first item, said second item, and said third item from said entity, said number of facings of said first item being greater than said number of facings of said second item where said purchase history indicates said first item has been purchased by said patron more than said second item and said number of facings of said second item being greater than said number of facings of said third item where said purchase history indicates said second item has been purchased by said patron more than said third item;
instructions for using at least a set of rules specific to said entity to create said virtual aisle; and
instructions for displaying at least a portion of said virtual aisle on an output accessible to said patron, said portion including said first item, said second item, and said third item, and their facings;
wherein, in generating said virtual aisle, said set of rules causes to be taken into account unpurchased items previously considered but not purchased by said patron.

7. The computer readable medium of claim 6, wherein said set of rules includes at least an affinity rule.

8. The computer readable medium of claim 7, wherein said virtual aisle includes at least one pair of physically incompatible items disposed adjacent each other.

9. The computer readable medium of claim 8, wherein, a previously purchased item is presented to said patron on a plurality of virtual aisles based on said purchase history.

10. The computer readable medium of claim 9, further comprising instructions for updating a historical record of said patron based on an interaction of said patron with said virtual aisle.

11. The computer readable medium of claim 10, further comprising instructions for generating a second virtual aisle based on said updated historical record, said virtual aisle and said second virtual aisle being disparate.

12. The computer readable medium of claim 10, further comprising instructions for providing said displayed portion with a scroll bar to scroll in a leftward and a rightward direction.

13. A computer-implemented self-learning method to generate a personalized virtual aisle via a remote acquisition mechanism associated with an entity, comprising:
accessing, using an online structure, an image database to retrieve a plurality of images, each of said plurality of images representing an item offered by said entity;
determining a number of facings of each of a first item, a second item, and a third item on said virtual aisle based on a purchase history of a patron, said purchase history outlining a number of times said patron has previously purchased each of said first item, said second item, and said third item from said entity, said number of facings of said first item being greater than said number of facings of said second item where said purchase history outlines said patron has previously purchased said first item more than said second item, and said number of facings of said second item being greater than said number of facings of said third item where said purchase history outlines said patron has previously purchased said second item more than said third item; and
creating, using said online structure and a set of rules, said virtual aisle;
displaying at least portion of said virtual aisle on an output accessible to said patron, said portion including said first item, said second item, and said third item, and their facings;
wherein, a previously purchased item is presented to said patron on a plurality of virtual aisles based on said purchase history.

14. The computer-implemented method of claim 13, wherein said set of rules are entity-specific.

15. The computer-implemented method of claim 14, wherein said virtual aisle includes at least one pair of physically incompatible items disposed adjacent each other.

16. A computer-implemented self-learning method to generate a virtual aisle for a patron of an entity based on a set of rules, comprising:

accessing an image database to retrieve a plurality of images, each of said plurality of images representing at least one of a plurality of items being offered for sale by said entity;

using said set of rules to evaluate a purchase history of said patron to determine a number of facings on said virtual aisle of each of a first item, a second item, and a third item, said purchase history indicating a number of times said patron has purchased each of said first item, said second item, and said third item from said entity, said number of facings of said first item selected to be greater than said number of facings of said second item and said number of facings of said second item selected to be greater than said number of facings of said third item where said purchase history indicates said first item has been purchased by said patron more than said second item and said second item has been purchased by said patron more than said third item;

using said set of rules to locate next to each on said virtual aisle at least two items based on a determination that said at least two items have been purchased together; and displaying at least a portion of said virtual aisle on an output of said patron, said portion including said first item, said second item, and said third item, and their facings.

17. The computer-implemented method of claim of claim 16, further comprising including in said virtual aisle unpurchased items previously considered but not purchased by said patrons.

18. The computer-implemented of claim 17, further comprising displaying a promotional simulation including each of a video and an audio component.

* * * * *